United States Patent
Boufassa et al.

(12)

(10) Patent No.: US 6,699,517 B2
(45) Date of Patent: Mar. 2, 2004

(54) **METHOD FOR PREPARING FOOD PRODUCTS BY FERMENTING SOY MILK WITH *STREPTOCOCCUS THERMOPHILUS***

(75) Inventors: Corinne Boufassa, Igny (FR); Myriam Tourancheau, Palaiseau (FR)

(73) Assignee: Compagnie Gervais Danone, Levallois-Perr (FR)

( * ) Notice: Subject to any disclaimer, the term of this patent is extended or adjusted under 35 U.S.C. 154(b) by 0 days.

(21) Appl. No.: 10/187,441

(22) Filed: Jul. 2, 2002

(65) Prior Publication Data

US 2003/0031756 A1 Feb. 13, 2003

Related U.S. Application Data

(63) Continuation of application No. 09/555,216, filed as application No. PCT/FR98/02569 on Nov. 30, 1998, now abandoned.

(30) Foreign Application Priority Data

Nov. 28, 1997 (FR) .............................................. 97 15000

(51) Int. Cl.[7] .............................................. A23L 1/202
(52) U.S. Cl. .......................................... 426/46; 426/28
(58) Field of Search .............................. 426/18, 28, 46, 426/52, 618, 634

(56) References Cited

FOREIGN PATENT DOCUMENTS

| DE | 2 406 600 | | 8/1974 |
|---|---|---|---|
| EP | 0 111 420 A2 | | 6/1984 |
| EP | 0 622 024 | * | 11/1994 |
| JP | 78-78001 | | 6/1978 |
| KR | 93 05198 | * | 6/1993 |
| KR | 94 00319 | * | 1/1994 |
| WO | WO 89/08405 | | 9/1989 |

OTHER PUBLICATIONS

Bender, A. Dictionary of Nutrition and Food Technology, 6th Edition, p. 262, 1990.*

L. Ankenman Granata et al., "Improved Acid, Flavor and Volatile Compound Production in a High Protein and Fiber Soymilk Yogurt–like Product", *Journal of Food Science*, vol. 61, No. 2, Mar. 1996 (abstract), pp. 331–336.

Tridjoko W. Murti et al., "Bacterial Growth and Volatile Compounds in Yoghurt–Type Products for Soymilk Containing *Bifidobacterium ssp*", *Journal of Food Science*, vol. 00, No. 00, Jan./Feb. 1993, pp. 153–157.

Keiko Shirai et al., "Production of A Yogurt–like Product from Plant Foodstuffs and Whey. Substrate Preparation and Fermentation", *J. Science Food Agriculture,* 1992, pp. 199–204.

* cited by examiner

*Primary Examiner*—Keith Hendricks
(74) *Attorney, Agent, or Firm*—Morgan Lewis & Bockius LLP

(57) ABSTRACT

The invention provides a method for obtaining food products with reduced post-fermentation acidification, by fermenting mixtures of soy milk and either grain meal or almond milk with *Streptococcus thermophilus* and, optionally, other lactic acid bacteria.

14 Claims, 3 Drawing Sheets

METHOD FOR PREPARING FOOD PRODUCTS BY FERMENTING SOY MILK WITH *STREPTOCOCCUS THERMOPHILUS*

This is a continuation application of application Ser. No. 09/555,216 flied Jul. 10, 2000, now abandoned which is a U.S. National Stage Application of International Application No. PCT/FR98/02569 filed Nov. 30, 1998 which claims priority to French Patent Application No. FR9715000 filed Nov. 28, 1997, all of which are herein incorporated by reference in their entirety.

The invention relates to fermented products based on plant raw materials.

It is known to use plant raw materials, in particular cereals, as substitutes or supplements for raw materials of milk origin in the manufacture of fermented food products, with the aim of combining the beneficial properties of these plant products with those of lactic ferments.

For example, application EP 0,622,024 describes a product intended for early childhood feeding, consisting of 95% of yoghurt and 5% of a cereals meal mixture (oats, rice and wheat) and of soy extract, pasteurized beforehand and then fermented with *Bifidobacterium infantis* and optionally *Streptococcus thermophilus*, to a pH of about 4.6 to 4.7. It is indicated that this fermented supplement improves the nutritional value and the digestibility of the yoghurt, while providing nutrients which are essential for the growth of young children in a directly assimilable form, and that, in addition, the presence of the soy extract promotes the fermentative activity of *Bifidobacterium infantis*, and improves its viability. However, this document gives no precise information on the storage life of the fermented supplement or on that of the finished product (supplement+yoghurt), or on the effective rate of survival of the bacteria in the fermented supplement or in the final product.

Application EP 0,568,530 describes a product prepared from oat bran, mixed with water and gelatinized by a heat treatment at 100° C. for 20 min, and then fermented with lactic acid bacteria. The final product obtained is rich in fibre (β-glucans), obtained from the oat bran, and contains live lactobacilli ($10^5$ to $10^8$ CFU/g). This document also indicates that the product obtained can be stored for more than 2 weeks; the lactic acid content increases during storage.

Application EP 0,415,941 describes a liquid product intended for enteral feeding by tube, or for the preparation of a health drink. This product is prepared from oat flour hydrolysed with an α-amylase and a β-glucanase, optionally supplemented with soy flour in order to supplement it with proteins and fats, and then fermented by lactobacilli, in particular *Lactobacillus reuterii*. The liquid product obtained contains viable lactobacilli, and preserves its properties for about 8 days.

The main problem posed in the manufacture of this type of product is to reconcile, during the manufacture, packaging and storage, the longest possible survival of the lactic ferments, and the preservation of the organoleptic qualities of the product. For example, the post-acidification described in application EP 0,568,530, which reflects the viability of the lactobacilli, can constitute a disadvantage insofar as it causes a modification of the taste of the product, which modification is not necessarily liked by consumers.

The aim of the present invention is the production of food products based on raw materials of plant origin fermented by lactic acid bacteria, which are capable of preserving, after packaging and storage, both a high level of viability of the lactic ferments, and intact organoleptic qualities.

The inventors have observed that some lactic ferments, such as *Streptococcus thermophilus*, exhibit, when they are used to ferment raw materials of plant origin, a reduced post-acidification while retaining sufficient growth and viability. These ferments are therefore particularly suitable for the production of food products possessing the above-defined properties. The inventors have also observed that the use, as raw material of plant origin, of a mixture based on soy milk and a cereal hydrolysate by at least one amylase, and/or almond milk, provided a substrate which is particularly favourable for good growth of these ferments, and made it possible to carry out the fermentation under optimum conditions.

The subject of the present invention is a method for producing a food product by lactic acid fermentation of raw materials of plant origin, which method is characterized in that it comprises:

the preparation of a mixture comprising:
        a) soy milk, and
        b) a hydrolysate of at least one cereal by at least one amylase, and/or almond milk,
    the fermentation of the mixture with a lactic ferment comprising at least one strain of *Streptococcus thermophilus*.

Soy milk which can be used for carrying out the method in accordance with the present invention is for example the preparation known by the name of "tonyu" obtained from whole soy beans, and which is the subject of an AFNOR standard (NF V 29-001). Briefly, to obtain the tonyu, the soy beans are shelled and then mixed with water and ground in the hot state (>85° C.). The ground product is separated after settling out so as to separate the solid residue, called "okara", from the soy milk which constitutes the tonyu. The tonyu is then sterilized and then cooled to 40° C.

The cereal hydrolysate used to carry out the method in accordance with the present invention is obtained, for example, from a flour or from cereal flakes, which are hydrolysed, in a manner known per se, with at least one amylase, preferably with a β-amylase and an α-amylase. If it is desired to obtain a final product rich in fibres, it is possible to use a hydrolysate obtained from whole cereal flakes or flour. It is possible to advantageously use a rice, barley, wheat or oat hydrolysate, or a mixture thereof. In particular, the use of an oat hydrolysate makes it possible to obtain a product with a higher β-glucan content. By way of example, an oat hydrolysate which can be used in the context of the present invention is described in application PCT WO 95/07628.

For the sake of convenience, the cereal hydrolysate may be provided in powdered form; it is possible, in this case, to either add it directly to the soy milk, or to reconstitute, prior to the mixing with the soy milk, a liquid hydrolysate (also called hereinafter "hydrolysed cereal juice"), preferably comprising between 5 and 20% by weight of dry matter, by the addition of an appropriate quantity of water.

All or some of the hydrolysed cereal juice may be replaced with almond milk.

The use of the soy milk/constituent b) mixture ensures excellent fermentation conditions which allow the formation of a regular network between the molecules of the various constituents of the product, and confer on it a smooth and homogeneous texture.

Advantageously, to obtain a final product which is optimal both from the point of view of the organoleptic qualities and of the texture, the soy milk/constituent b) mixture comprises between 2.5% and 9%, and preferably about 5% (by weight) of dry matter obtained from the soy milk. The latter proportions give a raw material having contents of macronutrients (proteins, lipids and carbohydrates) which are equivalent to those of semi-skimmed milk.

If desired, it is possible to add to the mixture texturing agents, among those conventionally used in the manufacture of food products, in particular fermented dairy products. For example, starch may be used, in proportions of 2 to 3% by weight.

It is also possible to add one or more antioxidants, for example vitamin E, in order to prevent the oxidation of the polyunsaturated fatty acids present in the raw materials. If it is desired to increase the fibre content of the product, it is also possible to add, at this stage, dietary fibres, for example fructooligosaccharides (FOS).

After incorporation of the various constituents, the mixture is kept stirring (in general for 30 min to 1 hour), in order to rehydrate the components provided in solid form, and then sterilized (for example 130° C. for 2 to 20 s). It is possible to replace the sterilization step by a pasteurization heat treatment (for example at 95° C., for 5 min to 10 min) or by ultrahigh-temperature sterilization by direct injection of steam into the product (for example at 135° C., for 3 s).

Prior to the inoculation with the lactic ferments, the mixture is cooled to a temperature of about 25° C. to 45° C.

It is then inoculated with an inoculum of lactic acid bacteria, at an initial bacterial concentration of at least $10^4$ to $10^5$ CFU/g in the fermentation medium.

The inventors have, in addition, observed that some strains of Streptococcus thermophilus, while inducing only a very low post-acidification, retained an excellent viability. These strains, called "reduced post-acidification strains" are most particularly suitable for carrying out the present invention; they may be selected on the basis of their viability and post-acidification characteristics, after culturing on a 50/50 (v/v) mixture of the a) and b) constituents defined above, and storage and at a temperature of about 10° C.

Advantageously, a strain will be chosen which exhibits, under these conditions, the following characteristics:
the bacterial population, after 28 days, (for an initial inoculation of about $10^4$ to $10^5$ CFU/g), is at least $10^6$ CFU/g, preferably between $10^7$ and $10^9$ CFU/g;
the difference between the curd settling pH and the pH after 28 days ($\Delta pH\ D_0-D_{28}$) is less than or equal to 0.2.

A strain of Streptococcus thermophilus which can be used for carrying out the method in accordance with the invention is for example the strain deposited, according to the Budapest Treaty, on Dec. 30, 1994, at the CNCM (Collection Nationale de Cultures de Microorganismes) held by Institut Pasteur, 25 rue du Docteur Roux, in Paris, under the number I-1520.

For carrying out the method in accordance with the invention, it is also possible to combine the strain(s) of Streptococcus thermophilus with at least one lactic acid bacterium strain chosen from the group consisting of Bifidobacterium ssp., Lactobacillus ssp. (in particular L. plantarum, L. pentosus, L. bulgaricus, L. casei, L. acidophilus), Lactococcus ssp., Pediococcus ssp. and the like. The combined strain or strains are chosen according to the taste which it is desired to give to the final product. Depending on the combined strain, it is possible to observe a higher post-acidification than that observed with Streptococcus thermophilus alone; nevertheless, the $\Delta pH\ D_0-D_{28}$ remains less than or equal to 0.6.

Depending on the ferment used, the fermentation is carried out for 3 to 24 hours, and stopped at a pH of between 4 and 5.

At the end of the fermentation, the product may be made into a smooth paste in order to give it the desired texture. For example, if it is desired to obtain a drink, the making into a smooth paste is enhanced to increase the shearing and obtain a fluid texture. Stabilizing agents may also be added.

The product is then cooled to 20° C. It is possible, if desired, to add sugar, for example in the form of a sugar syrup (sucrose, fructose, cane sugar, honey), flavourings, fruits (preparation of fruits, concentrate, compote, juice, syrup), prior to the packaging and to the cooling to the storage temperature. The product can be stored at a temperature preferably of between 4° C. and 15° C.

The subject of the present invention is also the fermented products based on plant raw materials which can be obtained by the method in accordance with the invention, as defined above.

For example, products in accordance with the invention, obtained by fermentation with one or more strains of Streptococcus thermophilus with reduced post-acidification, optionally combined with Bifidobacterium, exhibit the following characteristics, after 28 days of storage at a temperature of about 10° C.:
they contain at least $10^6$, preferably between $10^7$ and $10^9$ CFU/ml of Streptococcus thermophilus;
the difference between their pH at the end of fermentation and their pH after 28 days of storage at a temperature of about 10° C. is less than 0.2 pH units.

It therefore appears that the lactic ferments present in the products obtained in accordance with the invention retain a high rate of survival, without this resulting in a reduction in the organoleptic qualities of the product, which would result in particular from an excessive post-acidification.

These characteristics allow in particular easy industrialization insofar as the finished product withstands buffer storage and long packaging times, without degradation of its qualities.

The invention will be understood more clearly with the aid of the additional description which follows, which refers to examples illustrating the preparation and the properties of the fermented products in accordance with the invention.

It should be clearly understood, however, that these examples are given solely by way of illustration of the subject of the invention and do not constitute in any manner a limitation thereto.

EXAMPLE 1

Viability and Post-Acidification Properties of Streptococcus thermophilus; Selection of a Strain of Streptococcus thermophilus with Reduced Post-Acidification Streptococcus thermophilus Viability and Post-Acidification on a Substrate of Plant Origin An oat juice is reconstituted by mixing hydrolysed oat powder (10% by weight of reconstituted juice) with water. This reconstituted oat juice is mixed with an equal weight of soy milk. The mixture is sterilized and then cooled to 42° C.

To test the viability and the post-acidification in the fermented product, the mixture is inoculated with $10^5$ CFU/g of the strain of Streptococcus thermophilus to be tested.

After fermentation at 38° C. for 6 to 8 hours, the mixture is cooled to 20° C., and its pH is measured (curd settling pH at $D_0$). The product is then stored at a temperature of 10° C. for 28 days.

The results are illustrated by Table 1 below.

TABLE I

| Strain of Streptococcus thermophilus | Curd settling pH ($D_0$) | Post-acidification (pH $D_{28}$) | $\Delta$ pH | Bacterial population ($D_{28}$) (CFU/g) |
|---|---|---|---|---|
| CNCM I-1520 | 4.77 | 4.72 | −0.05 | $7.5 \times 10^7$ |
| ST 1 | 4.76 | 4.52 | −0.24 | $1 \times 10^8$ |
| ST 2 | 4.74 | 4.62 | −0.12 | $1 \times 10^5$ |

*Streptococcus thermophilus* Viability and Post-Acidification on Milk

By way of comparison, the same experiments as above were carried out using, as fermentation substrate, milk supplemented with yeast extract (2 g/l of yeast autolysate). The results are illustrated by Table II below.

TABLE II

| Strain of Streptococcus thermophilus | Curd settling pH ($D_0$) | Post-acidification (pH $D_{28}$) | Δ pH | Bacterial population ($D_{28}$) (CFU/g) |
|---|---|---|---|---|
| CNCM I-1520 | 4.67 | −4.09 | 0.58 | $6 \times 10^8$ |
| ST 1 | 4.57 | 4.03 | −0.54 | $4.5 \times 10^8$ |
| ST 2 | 4.52 | 4.09 | −0.53 | $4 \times 10^8$ |

The post-acidification by the various strains of *Streptococcus thermophilus* is considerably higher in the case of milk than in the case of a substrate of plant origin; this difference is particularly marked in the case of the strain CNCM I-1520. On the substrate of plant origin, this strain exhibits both a reduced post-acidification and a good viability, which makes it particularly suitable for carrying out the method in accordance with the invention.

*Streptococcus thermophilus* Combined with BifidoBacterium Viability and Post-Acidification on a Substrate of Plant origin The same experiments on a substrate of plant origin as above were carried out by inoculating the substrate with $10^5$ CFU/g of the strain of *Streptococcus thermophilus* I-1520, and $10^6$ CFU/g of Bifidobacterium. The results are illustrated by Table III below.

TABLE III

| | Curd settling pH ($D_0$) | Post-acidification (pH $D_{28}$) | Δ pH | Bacterial population ($D_{28}$) (CFU/g) | |
|---|---|---|---|---|---|
| | | | | CNCM I-150 | Bifidobacterium |
| CNCM I-1520 + Bifidobacterium | 4.76 | 4.71 | −0.05 | $1 \times 10^8$ | $5 \times 10^7$ |

These results show that the addition of Bifidobacterium does not increase post-acidification and does not influence the viability of *Streptococcus thermophilus* (or improves it slightly).

EXAMPLE 2

Fermentation of an Oat/Soy Mixture by an *S. thermophilus*/Bifidobacterium Ferment 48.90 kg of hydrolysed oat juice is reconstituted by mixing 4.89 kg of hydrolysed oat powder in 44.01 kg of water. This reconstituted oat juice is mixed with 48.90 kg of soy milk and 2.50 kg of starch.

The 50/50 oat/soy mixture gives a raw material having macronutrient contents equivalent to those of semi-skimmed milk (that is to say 26% of the energy provided by proteins, 36% by lipids and 38% by carbohydrates).

The mixture is heated to 95° C. and then the temperature is increased to 130° C. for a few seconds in order to sterilize the mixture. After cooling to 42° C., the mixture is inoculated with a ferment containing $10^5$ to $5 \times 10^6$ CFU/g of *Streptococcus thermophilus* (I-1520) and $10^6$ to $10^7$ CFU/g of Bifidobacterium.

Figure 1:
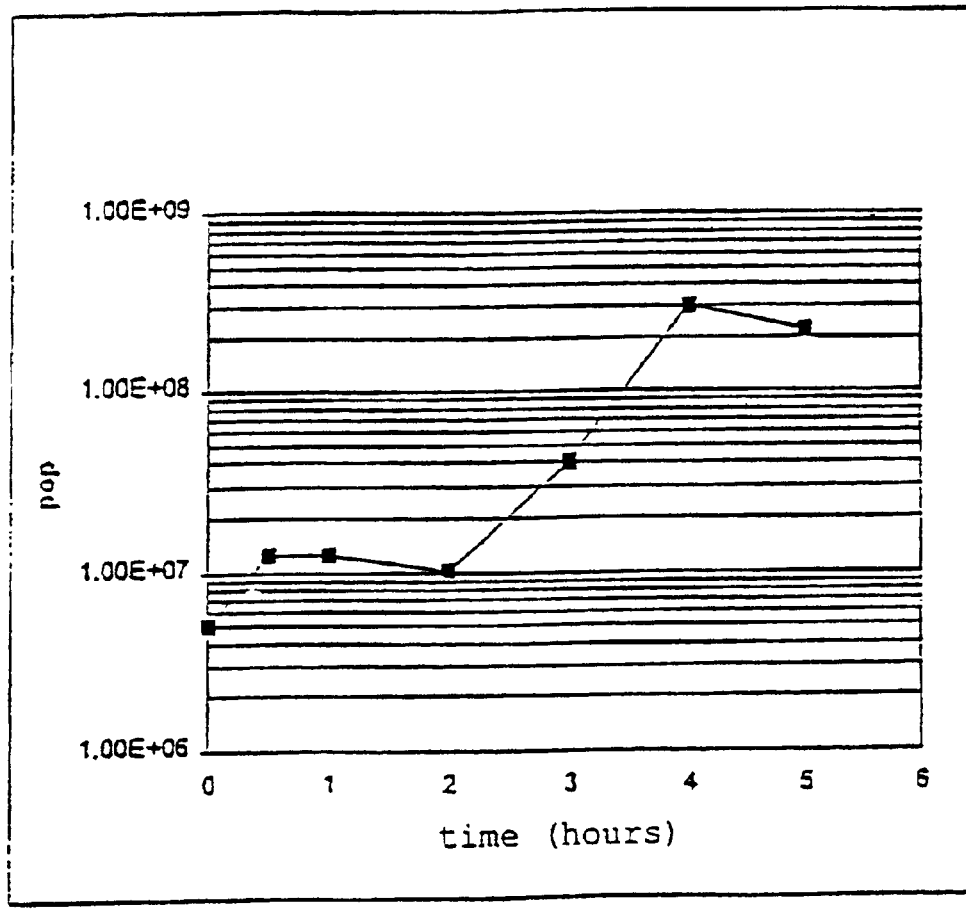
FIGS. 1 and 2 represent the respective growth curves for *S. thermophilus* CNCM I-1520, and for Bifidus ssp., during the fermentation of the mixture after inoculation with $4 \times 10^6$ CFU/g of *S. thermophilus*, and $10^7$ CFU/g of Difidus ssp. (on the x-axis: fermentation time; on the y-axis, bacterial population).
Figure 2:
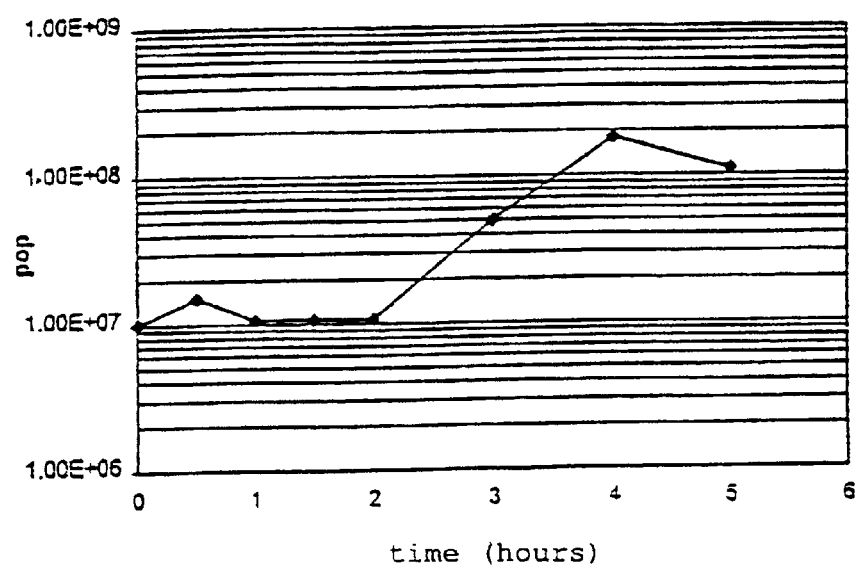
Figure 3:
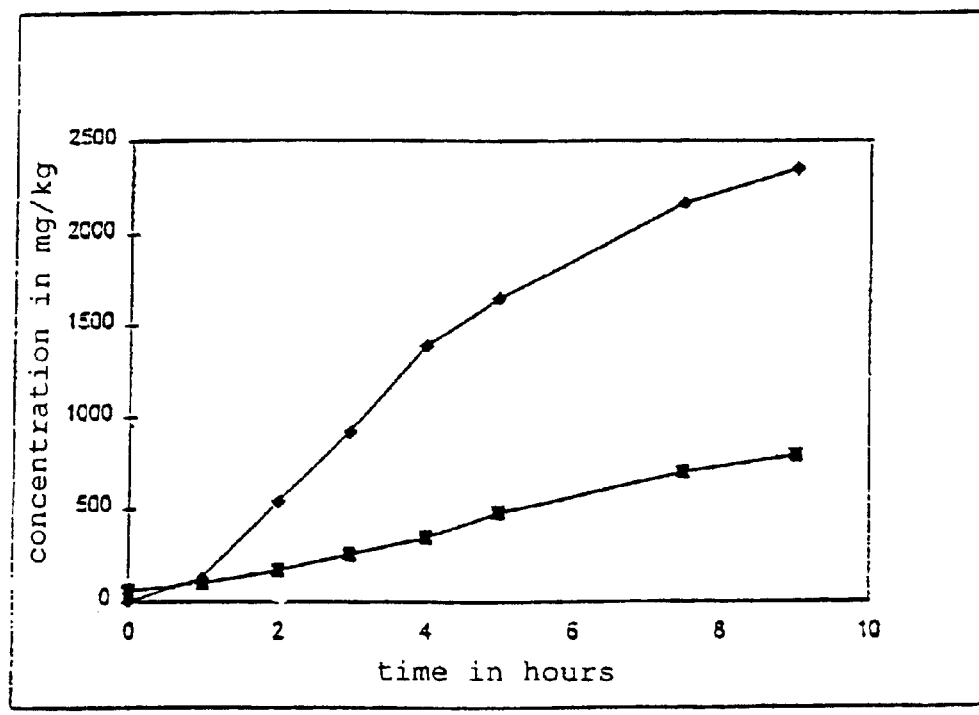
FIG. 3 represents the acidification of the mixture during fermentation after inoculation with $4 \times 10^6$ CFU/g of *S. thermophilus*, and $10^7$ CFU/g of Bifidus ssp. On the x-axis: fermentation time; on the y-axis: concentration of lactic acid (♦) and of acetic acid (■).

The fermentation is carried out at 38° C. for 6 to 8 hours until a pH of between 4.7 and 4.8 is obtained. The product curd is then separated after settling out at 20° C. and then made into a smooth paste on a smoothing valve at a flow rate of 140 to 240 l/hour. The product is then packaged into pots of 125 g.

The product obtained is smooth and soft and pale yellow in colour; it resembles a stirred yoghurt, it has an unctuous, very light mouthfeel. The fresh and light taste resembles oats; the taste characteristics of soy are not very perceptible. It contains 0.3% (by weight) of β-glucans and comprises neither cholesterol nor lactose. It contains polyunsaturated fatty acids (predominantly C18:2 linoleic acid, C18:3 α-linolenic acid).

This product is stable and can be stored for at least 28 days at a temperature of between 4 and 10° C.

The product was stored at 10° C. for 28 days. Neither exudation nor separation after settling or loss of texture was observed.

The measurements of pH made at $D_1$ and $D_{28}$ show a ΔpH of 0.13. At $D_7$, $3 \times 10^8$ CFU/g streptococci and $1.1 \times 10^8$ CFU/g bifidobacteria are counted. At $D_{28}$, the population is $10^8$ CFU/g streptococci and $8.5 \times 10^7$ CFU/g bifidobacteria.

EXAMPLE 3

Oat/Soy Mixture; *S. thermophilus*/Bifidobacterium Ferment; Fruit-Flavoured Product The procedure is carried out as in Example 2, and just before the packaging, a mixture is prepared comprising 70 to 75% (by weight) of white mass, 24% (by weight) of fruit preparation and 1 to 6% (by weight) of sugar syrup depending on the fruit variety used. Prune, fig, mango, blackcurrant and cherry fruit preparations may be mentioned by way of example, but others can be used. Storage trials of the products are carried out up to 28 days and at 4 and at 10° C. There is little difference between storage at 40° C. and storage at 10° C. The $\Delta pH_{max}$ in both cases is 0.08.

EXAMPLE 4

Oat/Soy Mixture; Yoghurt Ferment

The procedure is carried out as described in Example 2, but the starting mixture is inoculated with a ferment containing *Streptococcus thermophilus* and *Lactobacillus bulgaricus* at a rate of $10^5$ to $10^6$ CFU/g. The fermentation is carried out at 43° C. for 5 to 6 hours until a pH of between 4.5 and 5 is obtained. The product has a smooth and brilliant texture and a taste resembling oat flakes. The monitorings of pH show at $D_{28}$ a $\Delta pH_{max}$ of 0.2.

EXAMPLE 5

Oat/Soy Mixture; *S. thermophilus*/*L. phantarum* Ferment

The procedure is carried out as described in Example 2, but the starting mixture is inoculated with a ferment containing *Streptococcus thermophilus* $10^5$ to $10^6$ CFU/g and *Lactobacillus plantarum* $10^6$ to $10^7$ CFU/g. The inoculated mixture is packaged in pots of 125 g. The fermentation is carried out at 38° C. for 6 to 7 hours until a pH of between 4.5 and 5 is obtained. The product has a lighter spoon texture but it is more textured in the mouth than that of Example 2; it is, moreover, more flavoured and has a creamy taste. $7.5 \times 10^8$ CFU/g streptococci and $6.5 \times 10^7$ CFU/g lactobacilli are counted at $D_{28}$.

EXAMPLE 6

Oat/Soy Mixture; *S. thermophilus/L. casei* Ferment

The procedure is carried out as described in Example 5 and *Lactobacillus plantarum* is replaced with *Lactobacillus casei*. The fermentation is stopped at a pH of between 4.5 and 5 after 4 to 5 hours. The product is fluid, with a characteristic taste. The counts show a streptococcus population of $8 \times 10^8$ CFU/g and $1 \times 10^8$ CFU/g lactobacilli at $D_{28}$.

EXAMPLE 7

Almond/Soy Mixture; *S. thermophilus/L. casei/Bifidobacterium* Ferment

The procedure is carried out as described in Example 2, but the reconstituted hydrolysed oat juice is replaced with an almond milk and the mixture is inoculated with a ferment containing *Streptococcus thermophilus* $10^5$ to $10^6$ CFU/g, *Lactobacillus casei* $10^6$ to $10^7$ (FU/g and Bifidobacterium at $10^6$ to $10^7$ CFU/g. The product is fermented at 38° C. for 4 to 5 hours. Fermentation is stopped at a pH of between 4.6 and 4.8. The product has a white colour similar to that of whole milk with a typical, very pleasant, slightly acid almond taste.

EXAMPLE 8

Drink: Oat or Almond or Rice/Soy Mixture, Yoghurt Ferment 1 l of reconstituted hydrolysed oat juice or 1 l of almond milk or 1 l of hydrolysed rice juice is mixed with 1 l of soy milk. In the case of drinks, no starch is put into the starting mixture, but it is possible to add a stabilizing agent based on proteins and maltodextrins from rice to the mixture with rice juice. The method of Example 2 is used with a fermentation carried out at 43° C. for 5 to 15 hours. It is stopped at a pH of between 4.2 and 5.2 depending on the starting substrates.

The products thus obtained may be flavoured, or mixed with sugar syrups (5 to 8% by weight) or various fruit juices (25 to 30% by weight).

What is claimed is:

1. A method of producing a food product by lactic acid fermentation of raw materials of plant origin, comprising:

a) preparing a fermentation medium by mixing soy milk and at least one ingredient selected from the group consisting of almond milk and a hydrolysate of at least one cereal hydrolysed with an enzyme, wherein the enzyme is selected from the group consisting of alpha-amylases, beta-amylases, and mixtures of alpha and beta amylases;

b) inoculating the fermentation medium with an inoculum consisting of one or more strains of *Streptococcus thermophilus* that produce reduced post-acidification compared to other strains of *S. thermophilus;* and c) fermenting the mixture.

2. The method of claim 1, wherein the cereal in step a) is selected from the group consisting of rice, barley, wheat, and oat.

3. The method of claim 1, wherein the fermentation medium of step a) comprises between 2.5 and 9% by weight of dry matter obtained from soy milk.

4. The method of claim 3, wherein the fermentation medium of step a) comprises about 5% by weight of dry matter obtained from the soy milk.

5. The method of claim 1 wherein the innoculum comprises at least $10^4$ to $10^5$ CFU/g of fermentation medium.

6. The method of claim 1 further comprising the step of stopping the fermentation when the fermentation medium has a pH of between 4 and 5.2.

7. The method of claim 1, wherein the enzyme is a beta-amylase.

8. The method of claim 1, wherein the fermentation medium is a 50/50 (v/v) mixture of soy milk and either a) a hydrolysate of at least one cereal hydrolysed with an enzyme, wherein the enzyme is selected from the group consisting of alpha-amylases, beta-amylases, and mixtures of alpha and beta amylases or b) almond milk, and the fermented product is stored at a temperature of about 10° C. for 28 days, the method further comprising:

storing the fermented product at a temperature of about 10° C. for 28 days, whereby the bacterial population after 28 days of storage is at least $10^6$ CFU/g, for an innoculum of about $10^4$ to $10^5$ CFU/g of fermentation medium; and, the difference between the curd settling pH and the pH after 28 days of storage is less than or equal to 0.2.

9. The method of claim 8, wherein after 28 days of storage at a temperature of about 10° C., it contains between $10^7$ and $10^9$ CFU/g of *Streptococcus thermophilus*.

10. The method of claim 1, wherein at least one strain is selected as being capable of producing a post-acidification change in pH of about 0.2 pH units or less after storage for 28 days at 10° C.

11. The method of claim 1, wherein at least one strain is *Streptococcus thermophilus* CNCM Deposit No. I-1520.

12. A method of producing a food product by lactic acid fermentation of raw materials of plant origin, comprising:

a) preparing a fermentation medium comprising a 50/50 (v/v) mixture of soy milk and either i) a hydrolysate of at least one cereal hydrolysed with an enzyme, wherein the enzyme is selected from the group consisting of alpha-amylases, beta-amylases, and mixtures of alpha and beta amylases or ii) almond milk, b) inoculating the fermentation medium with an inoculum consisting of one or more strains of *Streptococcus thermophilus, wherein the one or more strains produce reduced post-acidification compared to other strains of S. thermophilus, and at least one lactic acid bacterium selected from the group consisting of Bifidobacterium sp., Lactobacillus casei, Lactobacillus plantarum;* c) fermenting the mixture;

d) storing the fermented product at a temperature of about 10 ° C. for 28 days, whereby the bacterial population after 28 days or storage is at least $10^6$ CFU/g for an inoculum of about $10^4$ to $10^5$ CFU/g of fermentation medium; and e) the difference between the curd settling pH and the pH after 28 days is less than or equal to 0.2.

13. The method of claim 12 wherein the enzyme is a beta-amylase.

14. The method of claim 12, wherein at least one strain is *Streptococcus thermophilus* CNCM Deposit No. I-1520.

* * * * *